Figure 1:
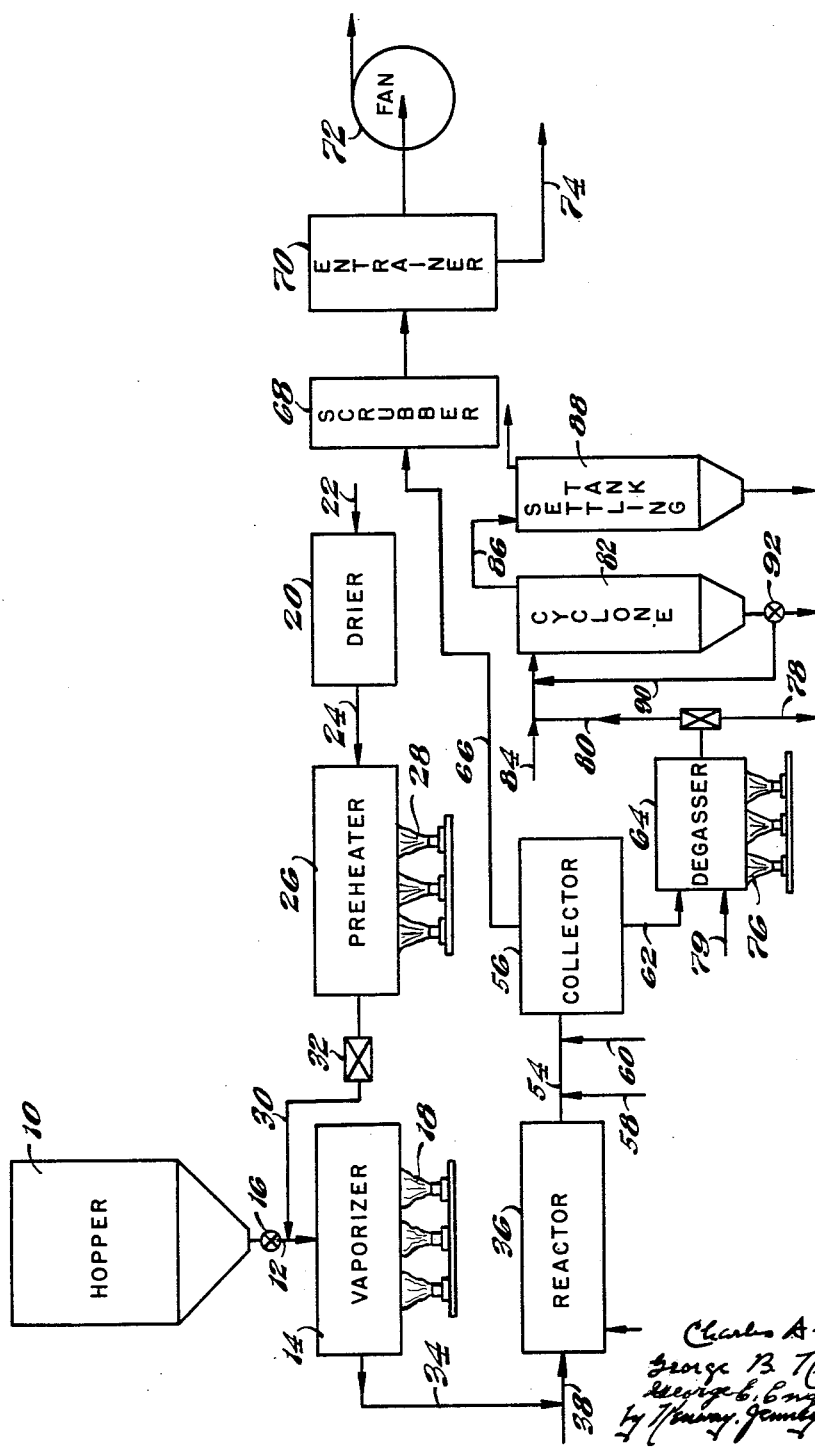

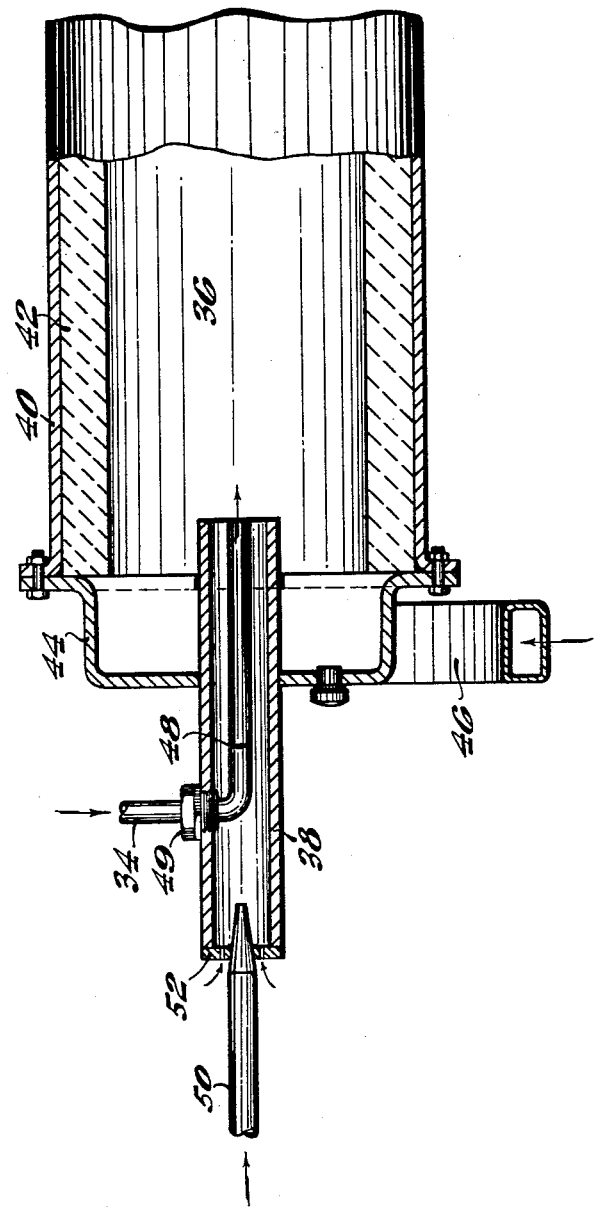

United States Patent Office 3,130,008
Patented Apr. 21, 1964

3,130,008
METHOD OF PREPARING METALLIC OXIDES BY HYDROLYSIS OF METALLIC HALIDES
Charles A. Stokes, Wellesley Hills, and George B. Kistiakowsky, Lincoln, Mass., and George E. Engelson, 34 Stafford Road, Kenberma, Mass.; said Stokes and said Kistiakowsky assignors, by mesne assignments, to Cabot Corporation, Boston, Mass., a corporation of Delaware
Filed Nov. 23, 1949, Ser. No. 129,089
15 Claims. (Cl. 23—140)

This invention relates to the production of metallic oxides, and comprises a novel process for producing oxides of such metals as aluminum, titanium, antimony, etc. of exceptional fineness of subdivision and high purity.

Aluminum oxide or alumina occurs in nature in such mineral form as corundum, ruby or sapphire. It may also be obtained from its mineral hydroxides among which are bauxite, diaspore and hydrargillite or from the aluminates of other metals. The aluminum oxides which are available from direct mineral sources are usually contaminated with impurities and in their natural condition are unsuitable for many uses.

Large quantities of aluminum oxide are now used in the ceramic industries, in refractory manufacture and in the manufacture of abrasives and polishing compounds. In more recent years, a large demand for aluminum oxide of exceptional purity and fine particle size has developed as a raw material for synthetic gems.

Aluminum oxides are usually classified according to their purity, process of manufacture and particle size. In general the more desirable and more expensive aluminas are those having the highest purity and finest particle size. While substantially pure finely divided aluminum oxides have been prepared by processes such as the ignition of ammonium alum, precipitation and calcination of aluminum hydroxide, oxidation of aluminum halides and hydrolysis of aluminum halides, no commercially practicable process has been devised, so far as we are aware, whereby pure finely divided alumina or other metal oxides may be produced in a controlled particle size range below 100 millimicrons at reasonable cost. It is the principal object of our invention to make available such a process.

As utilized in the production of aluminum oxide, the process of our invention is preferably carried out by introducing a stream of an aluminum halide vapor into an elongated, heat-insulated reaction chamber and simultaneously supplying a flame of hydrocarbon gas and air in close juxtaposition to the vapor stream. The aluminum halide is rapidly hydrolyzed in the flame to aluminum oxide in the form of an amorphous, finely divided pigment of particlulate diameter between about 20 and 100 millimicrons. The pigment passing out of the reactor in the gaseous reaction products may be collected by any suitable means, such as a bag filter, calcined to remove undesirable occluded gases and acid and then if necessary, cycloned and bolted to separate out contaminant solids picked up in the system. The resulting product is essentially pure alumina of substantially uniform particle size within the range specified. Our novel process may be operated continuously and at relatively low cost. From the foregoing description it will be seen that our process consists essentially in a reaction of the halide vapors with water vapor produced in the flame to produce the corresponding metal oxide.

Going into more detail our process may be carried out advantageously with aluminum chloride as the raw material and with natural gas composed predominantly of methane as the fuel for the flame. Aluminum chloride is fed to a heated vaporizer where it is caused to sublime. The resulting vapors are then conveyed into one end of the reactor either under their own vapor pressure or by means of dry heated air. It is important in carrying out the process of the present invention that the aluminum chloride vapor should be delivered to the reactor free of contamination by any hydrocarbon gas. Natural gas premixed with air is likewise injected into the reactor and preferably in such a manner as to surround the aluminum chloride vapors in order to provide intimate admixture of vapor with the air-gas mixture as combustion occurs. Combustion takes place at the moment of introduction of the mixture into the reactor and is further promoted by the introduction of an auxiliary air stream at some point near or behind the point of raw material-fuel injection. Reaction between aluminum chloride vapors and combustion products is very rapid with the result that extremely minute pigment particles are formed. With methane as the fuel gas and aluminum chloride as the halide, the overall reaction includes a first phase which is the production of water vapor in the medium of the flame, according to the reaction:

(1) 
$$CH_4 + 2O_2 \rightarrow CO_2 + 2H_2O$$

The production of the metal oxide occurs in the second phase of the overall reaction in which the metal halide reacts with the water vapor in the flame, according to the reaction:

(2) 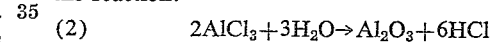
$$2AlCl_3 + 3H_2O \rightarrow Al_2O_3 + 6HCl$$

While we have discussed the process of our invention for illustrative purposes in its specific application to the production of aluminum oxide, it is not so limited but may be advantageously employed in producing finely divided oxides of other metals such, for example, as titanium, silicon, zinc, antimony, chromium, beryllium, zirconium, cobalt, nickel, boron, cadmium, molybdenum and vanadium when these metals are available as metallic halides.

The process of our invention will best be understood and appreciated from the following description of a preferred manner of putting it into practice using aluminum chloride and natural gas as the raw material and combustion fuel respectively, illustrated in the accompanying drawings in which:

FIG. 1 is a flow sheet of the process, and
FIG. 2 is a view in longitudinal section of the inlet end of a suitable form of reaction chamber.

Referring to the drawings, solid aluminum chloride is fed from hopper 10 through a duct 12 to vaporizer 14. The rate of feed from the hopper 10 may be controlled by any convenient means, here diagrammatically illustrated as a star valve 16. As the aluminum chloride enters the vaporizer 14 it is quickly vaporized by the heat maintained therein at between about 400° and 600° F. Heat may be furnished to the vaporizer and its contents by gas jets 18 or by any other convenient means.

The chloride vapors may be caused to flow into the reactor under their own vapor pressure or, as illustrated, air may be employed as a carrier gas and, to that end, air is introduced into a dryer 20 under pressure through the line 22. The dryer 20 may be of any conventional type in which the drying agent is calcium chloride, sulfuric acid or any other well-known drying agent. The air freed from its moisture content passes through a duct 24 from the dryer into a preheater 26 heated by gas jets 28 where the tempertaure of the air is raised to between 300° and 600° F. An air line 30, passing through the valve 32 which serves to control the rate of air flow, conducts the heated air to the duct 12 so that the air mingles with the solid aluminum chloride and enters the vaporizer 14 simultaneously therewith.

Aluminum chloride vapors and hot air, thoroughly mixed in a single stream and being at a temperature in the range above about 400° F., then flow out of the vaporizer through the pipe 34 which is preferably lagged to minimize heat loss and thence into a reaction chamber 36 through a burner 38 hereinafter described.

The reactor, which may be of any convenient cross sectional shape but which is here shown in FIG. 2 as being generally cylindrical, consists of a metal shell 40 lined with one or more courses of refractory material 42. The inlet end of the chamber is enclosed by a scroll-shaped metal header 44 having a duct 46 leading tangentially thereinto.

The burner assembly 38 consists of a metal pipe approximately 2" in diameter centered in and directed axially through the header 44 into the reaction chamber 36. Concentrically centered in the burner tube 38 is a smaller pipe 48 which is an extension of raw material feed line 34. A packing gland 49 prevents leakage around the pipe 34 where it passes through one side of the burner pipe 38.

Hydrocarbon gas, such as natural gas and air are both introduced into burner pipe 38 at the end outside the reaction chamber. A gas pipe 50 having a conical tapering tip is inserted part way into and is centered axially in the burner pipe 38. In order to limit and control the amount of air admitted between the gas pipe 50 and the sides of burner pipe 38 a cover plate 52 having a plurality of orifices or air ports is secured at the end of the pipe 38.

Since air entering the burner pipe 38 through the ports in a cover plate 52, together with the carrier air mixed with aluminum chloride vapor, is not sufficient to support complete combustion of the hydrocarbon gas, additional air is introduced into the reactor 36 through the duct 46 and the header 44. Owing to the fact that the duct 46 enters the header 44 tangentially the air tends to enter the reactor in a spirally swirling annular blanket contiguous to the cylindrical wall of the reactor.

In operation the hydrocarbon gas entering the burner from the pipe 50 draws in primary air through the ports in cover plate 52. Additional or secondary air—sufficient to make up the amount necessary for complete combustion of the gas—is pumped into the header 44 and the gas is burned in the zone of its injection in the reaction chamber 36. Simultaneously the hot air and aluminum chloride vapor mixture flows through the pipe 48 into the reaction chamber 36 in the center of the flame mass where it is instantly converted to its components of aluminum oxide and hydrochloric acid by hydrolysis with the water produced from the combustion.

It is, of course, essential in order to avoid contamination of the aluminum oxide pigment by carbon black when the gas is a hydrocarbon that the hydrocarbon be completely burned. Consequently, the total amount of air introduced into reactor 36 is preferably in excess of the amount necessary to achieve complete combustion. Additionally we have found that this excess air appears to encourage the formation of smaller particles.

The aluminum oxide pigment and products of combustion leave the reactor at a temperature roughly between about 700° and 1500° F. and pass out through a flue pipe 54 which is of sufficient length to cool the effluent of the reactor to about 350° F. before passing into a bag collector 56. To insure adequate cooling in the flue 54 additional ducts 58 and 60 may be provided for the introduction of air or other gases.

In the bag collector 56, which may be of any conventional type but in which the bags must be constructed of material resistant to hydrochloric acid gases, the pigment is collected and when shaken out of the bags is passed through a duct 62 to a degasser 64. The gases passing through the bags are conveyed by a duct 66 to a scrubber 68 and entrainer 70 from which they are exhausted to the atmosphere through a fan 72. Liquids trapped in entrainer 70 may be drawn off through a pipe 74.

The finely powered product recovered in the collector 56 consists of raw alumina containing from 1 to 10% impurities, such as adsorbed hydrochloric acid, dust particles and grit. These materials we remove as follows:

To remove the adsorbed gases the raw alumina is passed to a degasser 64 which may consist of a metal cylinder arranged to be rotated by any convenient means, and heated by gas jets 76, for example. The temperatures maintained in degasser 64 must be sufficiently high to drive the adsorbed hydrochloric acid from the alumina particles. We have used temperatures in the range of 1200° F. but lower or higher temperatures may be utilized with equal effect. Air is continuously passed through the degasser 64 from the air line 79 to flush the gases out of the degasser. The length of time during which the alumina remains in the degasser 64 will vary with the amount of adsorbed hydrochloric acid present and the heat applied. We have found that a period of 30 minutes at 1200° F. is ordinarily satisfactory to accomplish clean-up of the product. The alumina may then be drawn off from the degasser 64 for ultimate use through a pipe line 78 or, if grit is to be removed, may be conveyed through the pipe 80 to a cyclone separator 82.

To achieve separation in the cyclone a stream of air is introduced into the line 80 through an air line 84 at high velocity. In the cyclone grit and other heavy particles settle to the bottom and the grit-free alumina passes through a duct 86 into a settling tank 88 from the bottom of which it is ultimately removed. In the event that a substantial quantity of alumina should settle out in the cyclone with the grit, the settled material may be recycled through the cyclone through a return line 90 by suitable adjustments of a three-way valve 92 therein.

While we have shown and described conventional scrubbing and entraining equipment as the preferred method of removing hydrochloric acid from the gases such scrubbing equipment can be omitted if the flue gases have first been neutralized by anhydrous ammonia. The ammonia for that purpose may be introduced into the flue 54 through the duct 58, for example, where ammonia and chloride unite to form a valuable by-product, sal ammoniac ($NH_4Cl$).

The process hereinabove described produces an aluminum oxide which after degassing and cycloning has a particle size of 20–100 millimicrons more or less and a purity of 99% or better and is productive of yields which are in excess of 80% of the theoretical.

It will likewise be evident that the process of our invention herein described is extremely flexible in that flow rates of raw material vapor, gas and air may be varied over a wide range without any adverse effect upon the uniformity and purity of the product.

The average particle size of the product may be reduced by increasing the proportion of air to other gases introduced into the reactor. Thus, by making relatively minor adjustments in operating conditions we are able to produce exceedingly fine particles of finished product.

Illustrative of the practice of the process of our invention are the following data taken from a number of runs selected at random.

| Run | Surface Area (M.²/gram) | Particle Size (mm.) | Volume of Carrier Air (Cu. ft./hr.) | Primary Air (Cu. ft./hr.) | Secondary Air (Cu. ft./hr.) | Total Air (Cu. ft./hr.) | Hydrocarbon Gas (Cu. ft./hr.) | AlCl₃ Fed (lbs./hr.) | Production Rate (#/hr.) | Yield percent of Theoretical |
|---|---|---|---|---|---|---|---|---|---|---|
| 97 | 137.4 | 12.2 | 1,000 | 300 | 510 | 1,810 | 60 | 5.3 | 1.6 | 80 |
| 90 | 107.9 | 15.5 | 975 | 360 | 0 | 1,335 | 72 | 8.8 | 3.4 | 100 |
| 76 | 101.0 | 16.5 | 925 | 225 | 0 | 1,150 | 45 | 7.5 | 2.8 | 92 |
| 68 | 100.1 | 16.7 | 500 | 360 | 1,000 | 1,725 | 45 | 5.9 | 2.1 | 91 |
| 53 | 75.0 | 22.4 | 500 | 225 | 1,000 | 1,860 | 72 | 8.5 | 2.8 | 86 |
| 62 | 74.3 | 22.5 | 500 | 300 | 1,000 | 1,725 | 45 | 12.7 | 3.6 | 75 |
| 101 | 55.4 | 30.1 | 250 | 300 | 1,750 | 2,350 | 60 | 11.7 | 3.7 | 83 |
| 95 | 41.3 | 40.7 | 1,720 | 300 | 0 | 2,020 | 60 | 3.7 | 1.0 | 72 |
| 98 | 20.2 | 82.7 | 245 | 300 | 1,675 | 2,220 | 60 | 12.2 | 3.1 | 66 |

Having thus disclosed our invention and described in detail a preferred manner of putting it into effect, we claim as new and desire to secure by Letters Patent:

1. The process of producing finely divided oxides of a metal selected from the group consisting of aluminum, titanium, silicon, zinc, antimony, chromium, beryllium, zirconium, cobalt, nickel, cadmium, molybdenum and vanadium, which comprises vaporizing a halide of said metal, introducing said halide vapor free from contamination by hydrocarbon gas as a non-ignitable stream into an elongated reaction zone, simultaneously surrounding said stream with an annular flame containing water vapor formed therein as one of the combustion products and causing said stream to become intimately admixed with the combustion products in said flame, thereby hydrolyzing the metal halide vapor to the corresponding metal oxide by reaction with the water produced in said flame, and recovering the resulting pigment.

2. The process of producing finely divided aluminum oxide which comprises vaporizing a halide of aluminum, introducing said halide vapor free from contamination by hydrocarbon gas as a non-ignitable stream into an elongated reaction zone, simultaneously surrounding said stream with an annular flame containing water vapor formed therein as one of the combustion products and causing said stream to become intimately admixed with the combustion products in said flame, thereby hydrolyzing the halide vapor to aluminum oxide by reaction with the water produced in said flame, and recovering the resulting aluminum oxide.

3. The process defined by claim 2 in which the aluminum halide is aluminum chloride.

4. The process of producing finely divided silicon oxide which comprises vaporizing a halide of silicon, introducing said halide vapor free from contamination by hydrocarbon gas as a non-ignitable stream into an elongated reaction zone, simultaneously surrounding said stream with an annular flame containing water vapor formed therein as one of the combustion products and causing said stream to become intimately admixed with the combustion products in said flame, thereby hydrolyzing the halide vapor to silicon oxide by reaction with the water produced in said flame, and recovering the resulting silicon oxide.

5. The process defined by claim 4 in which the silicon halide is silicon tetrachloride.

6. The process of producing finely divided titanium oxide which comprises vaporizing a halide of titanium, introducing said halide vapor free from contamination by hydrocarbon gas as a non-ignitable stream into an elongated reaction zone, simultaneously surrounding said stream with an annular flame containing water vapor formed therein as one of the combustion products and causing said stream to become intimately admixed with the combustion products in said flame, thereby hydrolyzing the halide vapor to titanium oxide by reaction with the water produced in said flame, and recovering the resulting titanium oxide.

7. The process defined by claim 6 in which the titanium halide is titanium tetrachloride.

8. The process of producing finely divided zinc oxide which comprises vaporizing a halide of zinc, introducing said halide vapor free from contamination by hydrocarbon gas as a non-ignitable stream into an elongated reaction zone, simultaneously surrounding said stream with an annular flame containing water vapor formed therein as one of the combustion products and causing said stream to become intimately admixed with the combustion products in said flame, thereby hydrolyzing the halide vapor to zinc oxide by reaction with the water produced in said flame, and recovering the resulting zinc oxide.

9. The process of producing finely divided aluminum oxide which comprises vaporizing a halide of aluminum, introducing said halide vapor free from contamination by hydrocarbon gas as a non-ignitable stream into an elongated reaction zone, simultaneously surrounding said stream with an annular flame containing water vapor formed therein as one of the combustion products and causing said stream to become intimately admixed with the combustion products in said flame, thereby hydrolyzing the halide vapor to aluminum oxide by reaction with the water produced in said flame, and recovering the resulting aluminum oxide, finally calcining the aluminum oxide in a confined space at a temperature sufficiently high to drive off halide acid gas adsorbed on the oxide, and flushing out the gas driven off from the product.

10. The process of producing finely divided oxides of a metal selected from the group consisting of aluminum, titanium, silicon, zinc, antimony, chromium, beryllium, zirconium, cobalt, nickel, cadmium, molybdenum and vanadium, which comprises vaporizing a halide of said metal, introducing said halide vapor free from contamination by hydrocarbon gas as a non-ignitable stream into an elongated reaction zone, simultaneously surrounding said stream with an annular flame produced by burning a gaseous hydrocarbon in air and containing water vapor formed therein as one of the combustion products and causing said stream to become intimately admixed with the combustion products in said flame, thereby hydrolyzing the metal halide vapor to the corresponding metal oxide by reaction with the water produced in said flame, and recovering the resulting pigment.

11. The process of producing finely divided aluminum oxide which comprises vaporizing a halide of aluminum, introducing said halide vapor free from contamination by hydrocarbon gas as a non-ignitable stream into an elongated reaction zone, simultaneously surrounding said stream with an annular flame produced by burning a gaseous hydrocarbon in air and containing water vapor formed therein as one of the combustion products and causing said stream to become intimately admixed with the combustion products in said flame, thereby hydrolyzing the halide vapor to aluminum oxide by reaction with the water produced in said flame, and recovering the resulting aluminum oxide.

12. The process defined by claim 11 wherein the hydrocarbon gas and a portion of the air for burning the hydrocarbon gas are premixed and introduced in an annular stream surrounding the stream of vapor, and additional air is introduced in a spirally moving stream surrounding said annular stream.

13. The process of producing finely divided oxides of a metal selected from the group consisting of aluminum, titanium, silicon, zinc, antimony, chromium, beryllium, zirconium, cobalt, nickel, cadmium, molybdenum and vanadium, which comprises vaporizing a halide of said metal, mixing said halide vapor with a carrier gas which forms a non-ignitable mixture with said vapor, introducing said halide vapor mixture free from contamination by hydrocarbon gas as a stream into an elongated reaction zone, simultaneously surrounding said stream with an annular flame containing water vapor formed therein as one of the combustion products and causing said stream to become intimately admixed with the combustion products in said flame, thereby hydrolyzing the metal halide vapor to the corresponding metal oxide by reaction with the water produced in said flame, and recovering the resulting pigment.

14. The process of producing finely divided aluminum oxide comprising vaporizing aluminum chloride, mixing said vapor with a carrier gas which forms a non-ignitable mixture with said vapor, introducing said vapor mixture free of contamination by hydrocarbon gas as a stream into an elongated reaction zone, simultaneously surrounding said stream with an annular flame containing water vapor formed therein as a combustion product and causing said stream to become intimately admixed with the combustion products in said flame, thereby hydrolyzing the chloride vapor to aluminum oxide by reaction with the water produced in said flame, and recovering the resulting aluminum oxide.

15. The process of producing finely divided aluminum oxide comprising vaporizing aluminum chloride, mixing said vapor with dry air to form a non-ignitable mixture, introducing said vapor mixture free of contamination by hydrocarbon gas as a stream into an elongated reaction zone, simultaneously surrounding said stream with an annular flame produced by burning a gaseous hydrocarbon in air and containing water vapor formed therein as a combustion product and causing said stream to become intimately admixed with the combustion products in said flame, thereby hydrolyzing the chloride vapor to aluminum oxide by reaction with the water produced in said flame, and recovering the resulting aluminum oxide.

References Cited in the file of this patent

UNITED STATES PATENTS

| | | |
|---|---|---|
| 1,760,962 | Phillips et al. | June 3, 1930 |
| 1,850,286 | Mittasch et al. | Mar. 22, 1932 |
| 1,967,235 | Ferkel | July 24, 1934 |
| 2,155,119 | Ebner | Apr. 18, 1939 |
| 2,333,948 | Muskat | Nov. 9, 1943 |
| 2,339,685 | De Simo et al. | Jan. 18, 1944 |
| 2,413,709 | Hoffman | Jan. 7, 1947 |
| 2,445,691 | Pechukas | July 20, 1948 |
| 2,823,982 | Saladin et al. | Feb. 18, 1958 |

FOREIGN PATENTS

| | | |
|---|---|---|
| 397,288 | Great Britain | Aug. 24, 1933 |

OTHER REFERENCES

"General Chemistry," by Horace G. Deming, fifth edition, fifth printing, 1944, page 603; John Wiley & Sons Inc., New York.